United States Patent
Oh et al.

(10) Patent No.: US 10,110,941 B2
(45) Date of Patent: Oct. 23, 2018

(54) METHOD AND DEVICE FOR TRANSMITTING AND RECEIVING BROADCAST SERVICE IN HYBRID BROADCAST SYSTEM ON BASIS OF CONNECTION OF TERRESTRIAL BROADCAST NETWORK AND INTERNET PROTOCOL NETWORK

(71) Applicant: LG ELECTRONICS INC., Seoul (KR)

(72) Inventors: Sejin Oh, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/780,217

(22) PCT Filed: Jun. 27, 2014

(86) PCT No.: PCT/KR2014/005740
§ 371 (c)(1),
(2) Date: Sep. 25, 2015

(87) PCT Pub. No.: WO2014/209057
PCT Pub. Date: Dec. 31, 2014

(65) Prior Publication Data
US 2016/0037199 A1   Feb. 4, 2016

Related U.S. Application Data

(60) Provisional application No. 61/839,872, filed on Jun. 27, 2013.

(51) Int. Cl.
H04N 21/436 (2011.01)
H04N 21/2665 (2011.01)
(Continued)

(52) U.S. Cl.
CPC ... *H04N 21/2665* (2013.01); *H04N 21/23605* (2013.01); *H04N 21/42638* (2013.01);
(Continued)

(58) Field of Classification Search
CPC .................. H04N 21/436; H04N 21/64707
See application file for complete search history.

(56) References Cited

U.S. PATENT DOCUMENTS 5,916,305 A * 6/1999 Sikdar ................. G06F 17/2705
709/230
8,135,038 B2 * 3/2012 Song .................... H04L 1/0041
370/474
(Continued)

FOREIGN PATENT DOCUMENTS

KR   10-2007-0084775 A   8/2007
KR   10-2009-0022894 A   3/2009
(Continued)

OTHER PUBLICATIONS

"Hybrid Broadcast Broadbank TV", ETSI TS 102 796 V.1.2.1 (Nov. 2012), Nov. 1, 2012, XP055177671.

*Primary Examiner* — Nasser Goodarzi
*Assistant Examiner* — Adil Ocak
(74) *Attorney, Agent, or Firm* — Dentons US LLP

(57) ABSTRACT

The present invention relates to a device for receiving a hybrid broadcast service and a method for transmitting the same. The device for receiving a hybrid broadcast service, according to one embodiment of the present invention, comprises: a first reception unit for receiving a first broadcast signal transmitted through a first network; a second reception unit for receiving a second broadcast signal transmitted through a second network, wherein the broadcast signal includes a service information table; a signaling information processing unit for extracting the service information table from the broadcast signal, wherein the service
(Continued)

information table includes a component identifier descriptor for signaling information for identifying each of a plurality of components constituting one broadcast service, the component identifier descriptor including identification information; and an audio/video processing unit for acquiring the broadcast service including the plurality of components by using the component identification information, and decoding and reproducing the acquired broadcast service.

10 Claims, 19 Drawing Sheets

(51) Int. Cl.
    *H04N 21/426* (2011.01)
    *H04N 21/434* (2011.01)
    *H04N 21/438* (2011.01)
    *H04N 21/462* (2011.01)
    *H04N 21/643* (2011.01)
    *H04N 21/854* (2011.01)
    *H04N 21/236* (2011.01)
    *H04N 21/61* (2011.01)
(52) U.S. Cl.
    CPC ..... *H04N 21/4345* (2013.01); *H04N 21/4381* (2013.01); *H04N 21/4622* (2013.01); *H04N 21/6112* (2013.01); *H04N 21/6125* (2013.01); *H04N 21/64322* (2013.01); *H04N 21/85406* (2013.01)

(56) References Cited

U.S. PATENT DOCUMENTS

| 8,234,681 | B2* | 7/2012 | Hong | H04N 5/76 |
|---|---|---|---|---|
| | | | | 725/112 |
| 8,250,619 | B2* | 8/2012 | Song | H04N 21/23614 |
| | | | | 725/118 |
| 8,302,133 | B2* | 10/2012 | Yoo | H04N 5/44543 |
| | | | | 370/312 |
| 2009/0055864 | A1 | 2/2009 | Yoo et al. | |
| 2009/0083794 | A1 | 3/2009 | Lee et al. | |
| 2010/0017839 | A1 | 1/2010 | Song et al. | |
| 2010/0141738 | A1 | 6/2010 | Lee et al. | |
| 2010/0232550 | A1* | 9/2010 | Lee | H04L 27/06 |
| | | | | 375/341 |
| 2012/0226494 | A1 | 9/2012 | Ejima | |

FOREIGN PATENT DOCUMENTS

| KR | 10-2009-0031014 A | 3/2009 |
|---|---|---|
| KR | 10-2010-0050426 A | 5/2010 |
| WO | 2009008676 A2 | 1/2009 |

* cited by examiner

| network_protocol Value | Meaning |
|---|---|
| 000 | IPv4 (conforminf to RFC STD05 [5]) |
| 001-110 | ATSC reserved |
| 111 | framed_packet_type, as defined in Table 6.3 |

FIG. 5

| Syntax | No. of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     reserved | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (i=0; i<num_services; i++) | | |
|   } | | |
|     service_id | 16 | uimsbf |
|     reserved | 2 | '11' |
|     service_status | 2 | uimsbf |
|     SP_indicator | 1 | bslbf |
|     short_service_name_length /* m */ | 3 | uimsbf |
|     short_service_name | 16*m | bslbf |
|     reserved | 2 | '11' |
|     service_category | 6 | uimsbf |
|     reserved | 3 | '111' |
|     num_components | 5 | uimsbf |
|     for (j=0; j<num_components; j++) | | |
|     { | | |
|       essential_component_indicator | 1 | bsblf |
|       reserved | 3 | '111' |
|       num_component_level_descriptors | 4 | uimsbf |
|       for (k=0; k<num_component_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) | | |
|     { | | |
|       service_level_descriptor() | var | |
|     } | | |
|   } | | |
| } | | |

FIG. 6

| service_category | Meaning |
|---|---|
| 0x00 | The service category is not specified |
| 0x01 | Basic TV |
| 0x02 | Basic Radio |
| 0x03 | RI service – Rights Issuer service |
| 0x04 | Not specified by the current version of this standard |
| 0x05 | Not specified by the current version of this standard |
| 0x06 | Not specified by the current version of this standard |
| 0x07 | Not specified by the current version of this standard |
| 0x08 | Service Guide – Service Guide (Announcement) |
| 0x09 | Emergency Alerting |
| 0x0A | Not specified by the current version of this standard |
| 0x0B ~ 0xFF | Reserved for future use |

FIG. 7

| Syntax | No. of Bits | Format |
|---|---|---|
| service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_services | 8 | uimsbf |
|     for (i=0; i<num_services; i++) | | |
|     } | | |
|         service_id | 16 | uimsbf |
|         multi_ensemble_service | 2 | uimsbf |
|         service_status | 2 | uimsbf |
|         SP_indicator | 1 | bslbf |
|         short_service_name_length /* m */ | 3 | uimsbf |
|         short_service_name | 16*m | bslbf |
|         reserved | 2 | '11' |
|         service_category | 6 | uimsbf |
|         reserved | 3 | '111' |
|         num_components | 5 | uimsbf |
|         for (j=0; j<num_components; j++) | | |
|         { | | |
|             essential_component_indicator | 1 | bsblf |
|             reserved | 3 | '111' |
|             num_component_level_descriptors | 4 | uimsbf |
|             for (k=0; k<num_component_level_descriptors; k++) | | |
|             { | | |
|                 component_level_descriptor() | var | |
|             } | | |
|         } | | |
|         reserved | 4 | '1111' |
|         num_service_level_descriptors | 4 | uimsbf |
|         for (m=0; m<num_service_level_descriptors; m++) | | |
|         { | | |
|             service_level_descriptor() | var | |
|         } | | |
|     reserved | 4 | '1111' |
|     num_ensemble_level_descriptors | 4 | uimsbf |
|     for (n=0; n<num_ensemble_level_descriptors; n++) { | | |
|     { | | |
|         ensemble_level_descriptor() | var | |
|     } | | |
| } | | |

FIG. 8

| Syntax | No. of Bits | Format |
|---|---|---|
| stream_identifier_descriptor(){ | | |
|     descriptor_tag | 8 | uimsbf |
|     descriptor_length | 8 | uimsbf |
|     component_tag | 8 | uimsbf |
| } | | |

FIG. 9

| Syntax | No. of Bits | Format |
|---|---|---|
| data_path_descriptor() { | | |
|     descriptor_tag | 8 | uimsbf |
|     descriptor_length | 8 | uimsbf |
|     delivery_network_type | 8 | uimsbf |
|     data_path(delivery_network_type) | var | |
| } | | |

FIG. 10

| delivery_network_type value | Designation |
|---|---|
| 0x00 | IPv4/IPv6 flows through same broadcast or over the cellular network |
| 0x01 | IPv4/IPv6 flows through different broadcast |
| 0x02 | FLUTE session through same broadcast |
| 0x03 | FLUTE session through different broadcast |
| 0x04 | MPEG-2 stream through different broadcast |
| 0x05 | packet-based flows through different broadcast |
| 0x06 | packet-based flows through IP-based broadcast network |
| 0x07 | URL |
| 0x0B ~ 0xFF | Reserved |

FIG. 11

| Syntax | No. of Bits | Format |
|---|---|---|
| data_path() { | | |
|    IP_version_flag | 1 | bslbf |
|    source_IP_address_flag | 1 | bslbf |
|    destination_IP_address_flag | 1 | bslbf |
|    reserved | 5 | '11111' |
|    if (source_IP_address_flag) | | |
|      source_IP_address | 32 or 128 | uimsbf |
|    if (destination_IP_address_flag) | | |
|      destination_IP_address | 32 or 128 | uimsbf |
|    port_num_count | 8 | |
|    if(port_num_count > 0) | | |
|      destination_UDP_port_num | 16 | uimsbf |
| } | | |

FIG. 12

| Syntax | No. of Bits | Format |
|---|---|---|
| data_path() { | | |
|     transport_stream_id | 16 | uimsbf |
|     IP_version_flag | 1 | bslbf |
|     source_IP_address_flag | 1 | bslbf |
|     destination_IP_address_flag | 1 | bslbf |
|     reserved | 5 | '11111' |
|     if (source_IP_address_flag) | | |
|         source_IP_address | 32 or 128 | uimsbf |
|     if (destination _IP_address_flag) | | |
|         destination_IP_address | 32 or 128 | uimsbf |
|     port_num_count | 8 | |
|     if(port_num_count > 0) | | |
|         destination_UDP_port_num | 16 | uimsbf |
| } | | |

FIG. 13

| Syntax | No. of Bits | Format |
|---|---|---|
| data_path() { | | |
|     IP_version_flag | 1 | bslbf |
|     source_IP_address_flag | 1 | bslbf |
|     reserved | 6 | '111111' |
|     if (source_IP_address_flag) | | |
|         source_IP_address | 32 or 128 | uimsbf |
|     destination_IP_address | 32 or 128 | uimsbf |
|     destination_UDP_port_num | 16 | uimsbf |
|     tsi | 16 | uimsbf |
| } | | |

FIG. 14

| Syntax | No. of Bits | Format |
|---|---|---|
| data_path() { | | |
|    transport_stream_id | 16 | uimsbf |
|    IP_version_flag | 1 | bslbf |
|    source_IP_address_flag | 1 | bslbf |
|    reserved | 1 | '111111' |
|    if (source_IP_address_flag) | | |
|       source_IP_address | 32 or 128 | uimsbf |
|    destination_IP_address | 32 or 128 | uimsbf |
|    destination_UDP_port_num | 16 | uimsbf |
|    tsi | 16 | uimsbf |
| } | | |

FIG. 15

| Syntax | No. of Bits | Format |
|---|---|---|
| data_path() { | | |
|     transport_stream_id | 16 | uimsbf |
|     reserved | 3 | bslbf |
|     pid | 13 | uimsbf |
| } | | |

FIG. 16

| Syntax | No. of Bits | Format |
|---|---|---|
| data_path() { | | |
|     transport_stream_id | 16 | uimsbf |
|     packet_id | 16 | uimsbf |
| } | | |

FIG. 17

| Syntax | No. of Bits | Format |
|---|---|---|
| data_path() { | | |
|    IP_version_flag | 1 | bslbf |
|    source_IP_address_flag | 1 | bslbf |
|    reserved | 6 | '111111' |
|    if(source_IP_address_flag) | | |
|       source_IP_address | 32 or 128 | uimsbf |
|    destination_IP_address | 32 or 128 | uimsbf |
|    destination_UDP_port_num | 16 | uimsbf |
|    packet id | 16 | uimsbf |
| } | | |

FIG. 18

| Syntax | No. of Bits | Format |
|---|---|---|
| data_path() { | | |
|    URL_length | 8 | |
|    for (i = 0; i < URL_length; i++){ | | |
|       URL_char | 8 | bslbf |
|    } | | |
| } | | |

FIG. 19

| Syntax | No. of Bits | Format |
|---|---|---|
| component_descriptor() { | | |
|     descriptor_tag | 8 | uimsbf |
|     descriptor_length | 8 | uimsbf |
|     component_type | 7 | uimsbf |
|     component_encryption_flag | 1 | bslbf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     } | | |
|     transport_parameters_text_length | 8 | uimsbf |
|     transport_parameters_text() | var | |
|     component_data(component_type) | var | |
| } | | |

FIG. 20

| component_type | Meaning |
| --- | --- |
| 0-34 | Assigned or reserved by IANA, except that 20–24, 27, and 29-30 are unassigned |
| 35 | H.264/AVC video stream component or H.264/SVC base layer stream component |
| 36 | SVC enhancement layer stream component |
| 37 | HE AAC v2 audio stream component |
| 38 | FLUTE file delivery session |
| 39 | STKM stream component |
| 40 | LTKM stream component |
| 41 | OMA-RME DIMS stream component |
| 42 | NTP timebase stream component |
| 43 – 70 | [Unassigned by IANA and reserved by ATSC for possible future use] |
| 71-76 | Reserved by IANA |
| 77-95 | Unassigned by IANA |
| 96-127 | Designated by IANA for dynamic use |

FIG. 21

| component_type | Meaning |
|---|---|
| 0-34 | Assigned or reserved by IANA, except that 20-24, 27, and 29-30 are unassigned |
| 35 | H.264/AVC video stream component or H.264/SVC base layer stream component |
| 36 | SVC enhancement layer stream component |
| 37 | HE AAC v2 audio stream component |
| 38 | FLUTE file delivery session |
| 39 | STKM stream component |
| 40 | LTKM stream component |
| 41 | OMA-RME DIMS stream component |
| 42 | NTP timebase stream component |
| 43 – 70 | [Unassigned by IANA and reserved by ATSC for possible future use] |
| 71 | ISO base media file format stream component |
| 70-76 | Reserved by IANA |
| 77-95 | Unassigned by IANA |
| 96-127 | Designated by IANA for dynamic use |

FIG. 22

| Syntax | No. of Bits | Format |
|---|---|---|
| component_data() { | | |
|     version | 8 | uimsbf |
|     profile | 8 | uimsbf |
| } | | |

_METHOD AND DEVICE FOR TRANSMITTING AND RECEIVING BROADCAST SERVICE IN HYBRID BROADCAST SYSTEM ON BASIS OF CONNECTION OF TERRESTRIAL BROADCAST NETWORK AND INTERNET PROTOCOL NETWORK_

This application is a U.S. National Phase Application under 35 U.S.C. § 371 of International Application PCT/KR2014/005740, filed on Jun. 27, 2014, which claims the benefit of U.S. Provisional Application No. 61/839,872 filed on Jun. 27, 2013, the entire content of the prior application is hereby incorporated by reference.

TECHNICAL FIELD

The present invention relates to a hybrid broadcast system and, more particularly, to a method and/or apparatus for transmitting and receiving broadcast services in a hybrid broadcast system based on cooperation of a terrestrial broadcast network and an Internet protocol network.

BACKGROUND ART

A hybrid broadcast service based on cooperation with an Internet protocol network corresponds to a representative application to be utilized in future Digital Television (DTV) services. The hybrid broadcast service refers to a service for transmitting enhancement data associated with broadcast Audio/Video (A/V) content transmitted over a terrestrial broadcast network, or a part of the broadcast A/V content over an Internet protocol network in real time. As such, users may experience various types of content.

A network structure for supporting the hybrid broadcast service is expressed using protocol layers. A group of various protocol layers is called a protocol stack. In general, the protocol stack includes an application layer, a transport layer, a network layer, a link layer, and/or a physical layer. A transmitter end sends data downwards from the application layer corresponding to the top layer of the protocol stack. Whenever the data passes through each layer, additional information to be used by the layer is added to a header of a packet. In contrast, a receiver end sends data upward from the physical layer corresponding to the bottom layer of the protocol stack.

Meanwhile, a legacy broadcast system includes and transmits signaling data in a broadcast signal to allow a user to rapidly receive a broadcast service or a broadcast component. The signaling data not only includes information about each stream of a transmitted broadcast service but also includes additional information, e.g., the name of the broadcast service.

Unlike a legacy broadcast system for transmitting a broadcast signal over a single broadcast network, a hybrid broadcast system is capable of providing various broadcast services and components to users. However, as various broadcast services are provided, the size of data to be transmitted is increased and thus a time taken to receive the broadcast services is also increased. In addition, since a user can change broadcast channels more frequently, a time taken by a receiver to find a selected broadcast channel is increased.

DISCLOSURE

Technical Problem

An object of the present invention devised to solve the problem lies in a method for transmitting and an apparatus for receiving broadcast services in a hybrid broadcast system based on cooperation of a terrestrial broadcast network and an Internet protocol network.

Another object of the present invention devised to solve the problem lies in signaling data appropriate for a hybrid broadcast system based on cooperation of a terrestrial broadcast network and an Internet protocol network.

Technical Solution

The object of the present invention can be achieved by providing a hybrid broadcast service reception apparatus including a first receiver for receiving a first broadcast signal transmitted over a first network, a second receiver for receiving a second broadcast signal transmitted over a second network, wherein at least one of the received first and second broadcast signals includes a service information table, a signaling information processor for extracting the service information table from the at least one of the received first and second broadcast signals, wherein the service information table includes a stream identifier descriptor for signaling information for identifying each of a plurality of components of one broadcast service, wherein the stream identifier descriptor includes component identification information for identifying each of the components, and an Audio/Video (A/V) processor for acquiring the broadcast service including the components, using the component identification information, and decoding and presenting the acquired broadcast service.

The service information table may further include a data path descriptor for signaling information about a transmission path of the broadcast service.

The data path descriptor may include delivery network type information indicating a network type for transmitting the broadcast service.

The data path descriptor may further include data path information indicating a specific transmission path of the broadcast service in a network environment based on the delivery network type information.

The first network may correspond to a terrestrial broadcast network based on the delivery network type information, and the second network may correspond to an Internet protocol network based on the delivery network type information.

The service information table may further include a component descriptor for signaling information about an encoding type of the components of the broadcast service.

The component descriptor may include ISO base media file format information.

The ISO base media file format information may include at least one of version information of an ISO base media file format and profile information of an ISO base media file format stream.

In another aspect of the present invention, provided herein is a hybrid broadcast service transmission method including encoding at least one of audio data, video data, and auxiliary data including a service information table, wherein the service information table includes a stream identifier descriptor for signaling information for identifying each of a plurality of components of one broadcast service, wherein the stream identifier descriptor includes component identification information for identifying each of the components, packetizing the encoded data based on a transport protocol, and transmitting the packetized data over at least one of a first network and a second network.

The service information table may further include a data path descriptor for signaling information about a transmission path of the broadcast service.

The data path descriptor may include delivery network type information indicating a network type for transmitting the broadcast service.

The data path descriptor may further include data path information indicating a specific transmission path of the broadcast service in a network environment based on the delivery network type information.

The first network may correspond to a terrestrial broadcast network based on the delivery network type information, and the second network may correspond to an Internet protocol network based on the delivery network type information.

The service information table may further include a component descriptor for signaling information about an encoding type of the components of the broadcast service.

The component descriptor may include ISO base media file format information.

The ISO base media file format information may include at least one of version information of an ISO base media file format and profile information of an ISO base media file format stream.

Advantageous Effects

According to the present invention, signaling information for identifying broadcast services and components may be transmitted in a hybrid broadcast system.

According to the present invention, information for signaling acquisition paths of broadcast services and components may be transmitted in a hybrid broadcast system.

According to the present invention, information for signaling encoding types of broadcast services and components may be transmitted in a hybrid broadcast system.

According to the present invention, broadcast services and components may be rapidly received/presented in a hybrid broadcast system.

DESCRIPTION OF DRAWINGS

FIG. 5 is a view showing a service map table according to an embodiment of the present invention.

FIG. 6 is a view showing descriptions indicated by field values of the service_category field of the service map table, according to an embodiment of the present invention.

FIG. 7 is a view showing a service map table further including ensemble-related fields, according to an embodiment of the present invention.

FIG. 8 is a view showing a stream_identifier_descriptor according to an embodiment of the present invention.

FIG. 9 is a view showing a data_path_descriptor according to an embodiment of the present invention.

FIG. 10 is a view showing field values of the delivery_network_type field, according to an embodiment of the present invention.

FIG. 11 is a view showing syntax of a data_path( ) field when the delivery_network_type field has a field value of "0x00", according to an embodiment of the present invention.

FIG. 12 is a view showing syntax of a data_path( ) field when the delivery_network_type field has a field value of "0x01", according to an embodiment of the present invention.

FIG. 13 is a view showing syntax of a data_path( ) field when the delivery_network_type field has a field value of "0x02", according to an embodiment of the present invention.

FIG. 14 is a view showing syntax of a data_path( ) field when the delivery_network_type field has a field value of "0x03", according to an embodiment of the present invention.

FIG. 15 is a view showing syntax of a data_path( ) field when the delivery_network_type field has a field value of "0x04", according to an embodiment of the present invention.

FIG. 16 is a view showing syntax of a data_path( ) field when the delivery_network_type field has a field value of "0x05", according to an embodiment of the present invention.

FIG. 17 is a view showing syntax of a data_path( ) field when the delivery_network_type field has a field value of "0x06", according to an embodiment of the present invention.

FIG. 18 is a view showing syntax of a data_path( ) field when the delivery_network_type field has a field value of "0x07", according to an embodiment of the present invention.

FIG. 19 is a view showing a component_descriptor according to an embodiment of the present invention.

FIG. 20 is a view showing a component_type list according to an embodiment of the present invention.

FIG. 21 is a view showing a component_type list including a component_type related to an ISO base media file format stream component, according to an embodiment of the present invention.

FIG. 22 is a view showing syntax of a component_data( ) field when a component_type indicates an ISO base media file format, according to an embodiment of the present invention.

BEST MODE

Hereinafter, the present invention will be described in detail by explaining embodiments of the invention with reference to the attached drawings. The invention may, however, be embodied in many different forms and should not be construed as being limited to the embodiments set forth herein.

The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1:
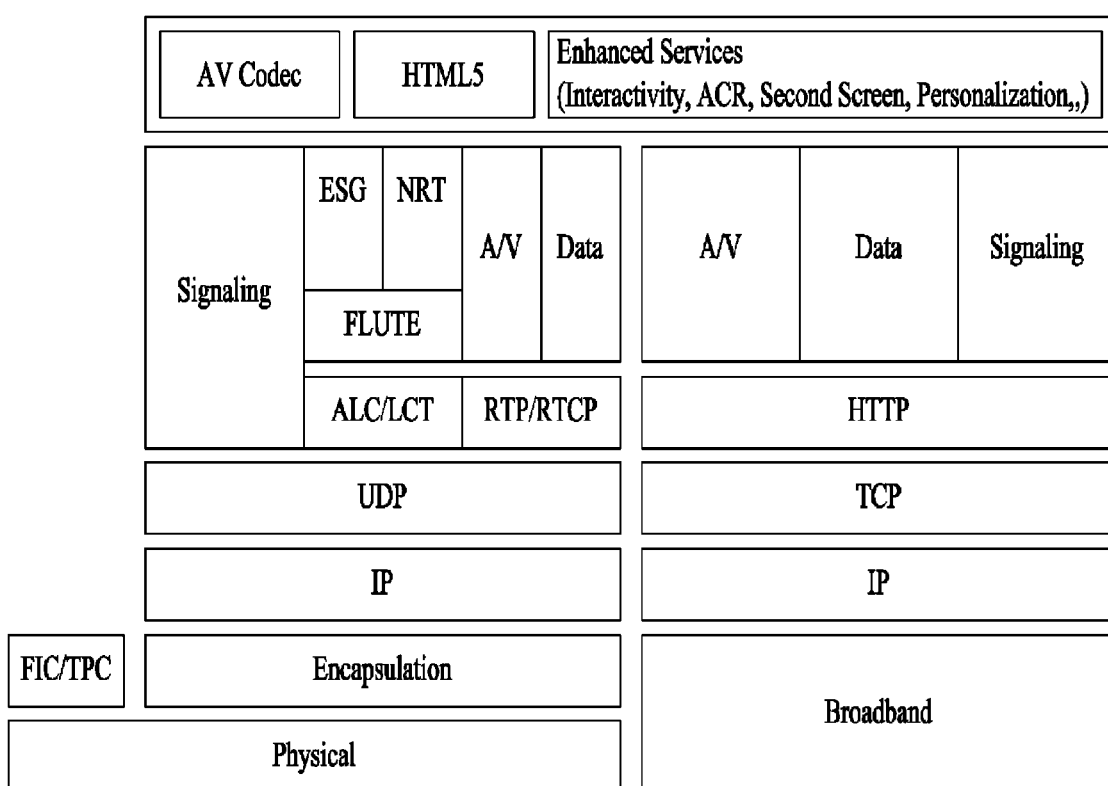
FIG. 1 is a view showing a protocol stack for supporting hybrid broadcast services, according to an embodiment of the present invention.

FIG. 1 is a view showing a protocol stack for supporting hybrid broadcast services, according to an embodiment of the present invention.

Real-time broadcast Audio/Video (A/V) content and data may be delivered in real time over a terrestrial broadcast network based on a Real time Transport Protocol (RTP), a User Datagram Protocol (UDP), and an Internet Protocol (IP). Non-real-time broadcast A/V content and data may be delivered in non-real time over a terrestrial broadcast network based on a File Delivery over Unidirectional Transport (FLUTE) protocol, a User Datagram Protocol (UDP), and an Internet Protocol (IP). Meanwhile, A/V content and data may be steamed in real time using MPEG-Dynamic Adaptive Streaming over HTTP (MPEG-DASH) over an Internet protocol network. In this case, each layer may use a Hyper-Text Transfer Protocol (HTTP), a Transmission Control Protocol (TCP), or an Internet Protocol (IP).

A physical layer may receive a terrestrial broadcast signal and convert the received terrestrial broadcast signal into an appropriate form.

Encapsulation may acquire an IP datagram from the information acquired by the physical layer, and convert the acquired IP datagram into a specific frame. Herein, the specific frame may be a Reed Solomon (RS) frame, a Generic Stream Encapsulation-lite (GSE-lite) frame, or a Generic Stream Encapsulation (GSE) frame.

A Transmission Parameter Channel (TPC) may deliver mapping information between the physical layer and the IP datagram, or deliver mapping information between the physical layer and the frame.

A Fast Information Channel (FIC) may deliver information for accessing services or content. For example, the information for accessing the services or content may be mapping information between a service ID and the frame.

Signaling data may include information for supporting effective acquisition of the services or content. The signaling data may include a service map table, a component identifier descriptor, component identification information, a data path descriptor, delivery network type information, data path information, a component descriptor, ISO base media file format information, version information of an ISO base media file format, and profile information of an ISO base media file format stream, according to an embodiment of the present invention.

A Real time Transport Protocol (RTP)/RTP Control Protocol (RTCP) is a protocol for real-time delivery of A/V data and other data.

An Asynchronous Layered Coding (ALC)/Layered Coding Transport (LCT) protocol is a protocol for non-real-time delivery of broadcast content and data such as an Electronic Service Guide (ESG) or a Non Real time Transport (NRT) service.

A File Delivery over Unidirectional Transport (FLUTE) protocol is a protocol for unidirectional delivery of files and appropriate for a multicast network.

Audio data, video data, or auxiliary data according to an embodiment of the present invention may be packetized by the protocols shown in FIG. 1, and the packetized data may be transmitted using the physical layer or a broadband.

A hybrid broadcast service reception apparatus according to an embodiment of the present invention may combine data received using the protocol stack of FIG. 1 and provide various enhanced services such as an interactive service and a second screen service to viewers.

The following embodiments of the present invention will be focused on a FLUTE protocol among session based transport protocols, but the technical idea of the present invention is not limited thereto.

Figure 2:
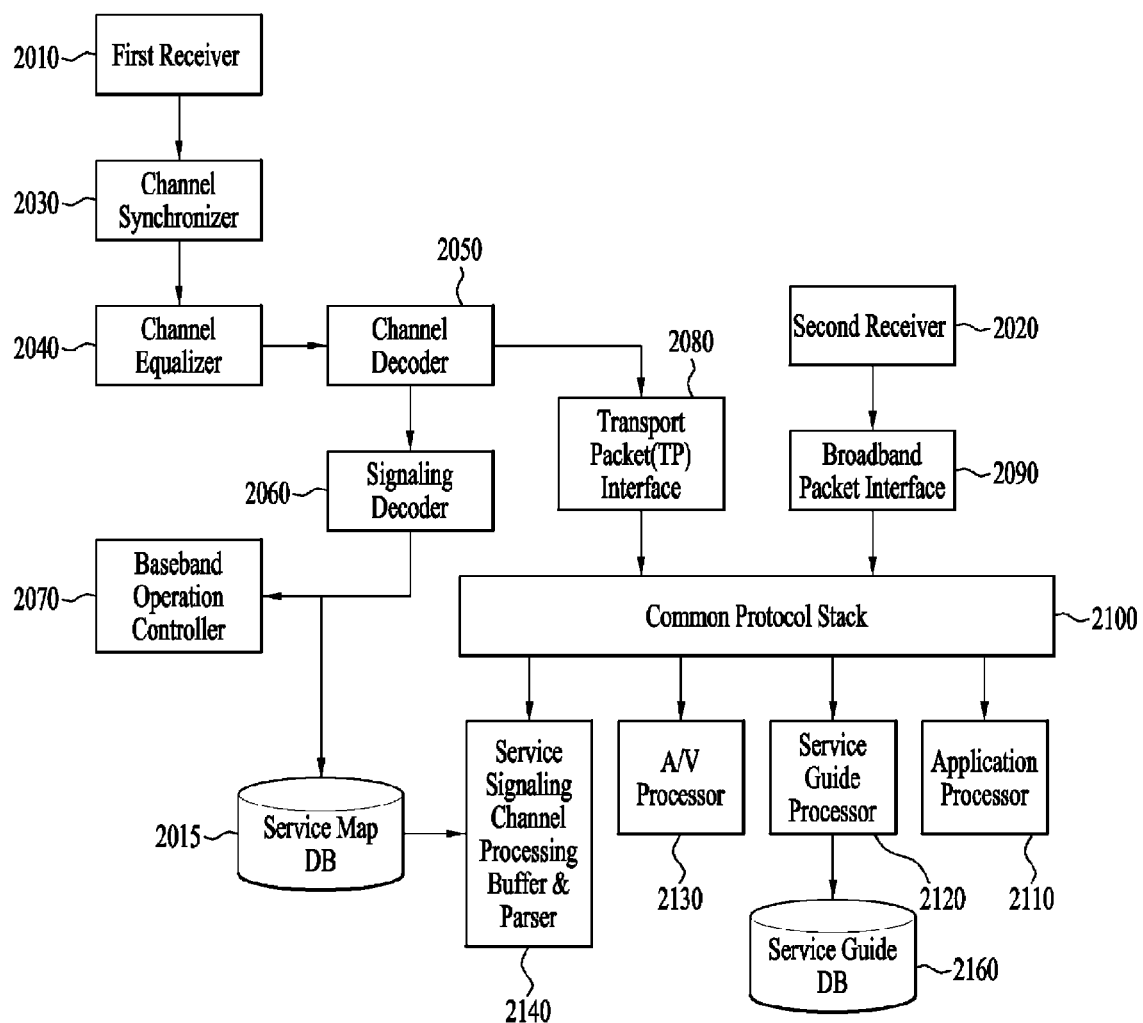
FIG. 2 is a view showing the operational flow of a hybrid broadcast service reception apparatus according to an embodiment of the present invention.

FIG. 2 is a view showing the operational flow of a hybrid broadcast service reception apparatus according to an embodiment of the present invention.

The hybrid broadcast service reception apparatus according to an embodiment of the present invention includes a first receiver 2010, a second receiver 2020, a channel synchronizer 2030, a channel equalizer 2040, a channel decoder 2050, a signaling decoder 2060, a baseband operation controller 2070, a transport packet interface 2080, a broadband packet interface 2090, a common protocol stack 2100, an application processor 2110, a service guide processor 2120, an A/V processor 2130, a service signaling channel processing buffer and parser 2140, a service map database (DB) 2150, and/or a service guide DB 2160.

The first receiver 2010 may receive a broadcast signal transmitted over a first network. The first network may be a terrestrial broadcast network, and the first receiver 2010 may be included in the channel synchronizer 2030. Alternatively, the channel synchronizer 2030 including the first receiver 2010 may be integrally called a first receiver.

The second receiver 2020 may receive a broadcast signal transmitted over a second network. The second network may be an Internet protocol network, and the second receiver 2020 may be included in the broadband packet interface 2090. Alternatively, the broadband packet interface 2090 including the second receiver 2020 may be integrally called a second receiver.

The channel synchronizer 2030 may serve to synchronize symbol frequency and timing for appropriate decoding in a baseband. In addition, the channel synchronizer 2030 may include the first receiver 2010.

The channel equalizer 2040 may serve to compensate for distortion of a received signal due to multiple paths, the Doppler effect, or the like.

The channel decoder 2050 may serve to restore the received signal into meaningful data. In addition, the channel decoder 2050 may perform Forward Error Correction (FEC).

The signaling decoder 2060 may serve to extract and decode signaling data delivered from a channel. The signaling data according to an embodiment of the present invention may be extracted and decoded by the signaling decoder 2060 or by the service signaling channel processing buffer and parser 2140 to be described below.

The baseband operation controller 2070 may serve to control various processing operations related to a baseband.

The transport packet interface 2080 may serve to extract a transport packet from a broadcast stream received from the channel decoder 2050. In addition, the transport packet interface 2080 may serve to combine signaling data or IP datagrams from the extracted transport packet.

The broadband packet interface 2090 may serve to extract a packet acquired over the Internet protocol network and combine signaling data or A/V data from the corresponding packet. In addition, the broadband packet interface 2090 may include the second receiver 2020, and the broadband packet interface 2090 including the second receiver 2020 may be integrally called a second receiver.

The common protocol stack 2100 may correspond to the protocol stack of FIG. 1. Data grouped on a packet basis may pass through each layer of the common protocol stack 2100 and be divided into signaling data, audio data, video data, service guide data, etc.

The application processor 2110 may serve to extract and process application-related information from the received signal.

The service guide processor 2120 may serve to extract announcement information from the received signal, manage the service guide DB 2160 to be described below, and provide a service guide.

The A/V processor 2130 may serve to decode and present the received audio and video data.

The service signaling channel processing buffer and parser 2140 may serve to extract and parse signaling information related to service or content scanning and acquisition from the IP datagram. In addition, the service signaling channel processing buffer and parser 2140 may include the above-described signaling decoder 2060. Alternatively, the service signaling channel processing buffer and parser 2140 including the signaling decoder 2060 may be called a signaling information processor, or each of the signaling decoder 2060 and the service signaling channel processing buffer and parser 2140 may be called a signaling information processor. Component identification information, delivery network type information, data path information, version information of an ISO base media file format, and/or profile information of an ISO base media file format stream, which are included in a service information table according to an embodiment of the present invention, correspond to signaling information related to acquisition of broadcast services, and may be extracted and parsed by the signaling information processor.

The service map DB 2150 may serve to store the signaling information decoded by the signaling decoder 2060, the service signaling channel processing buffer and parser 2140, or the signaling information processor.

The service guide DB 2160 may serve to store the service guide extracted and processed by the service guide processor 2120.

Figures 3, 4:
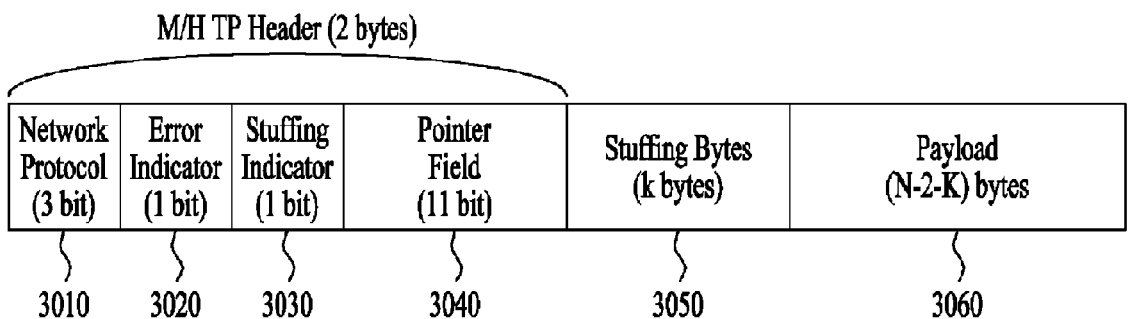
FIG. 3 is a view showing the structure of a transport packet received by a reception apparatus of a hybrid broadcast system, according to an embodiment of the present invention.
FIG. 4 is a view showing a network protocol field of a transport packet received by a reception apparatus of a hybrid broadcast system, according to an embodiment of the present invention.

FIG. 3 is a view showing the structure of a transport packet received by a reception apparatus of a hybrid broadcast system, according to an embodiment of the present invention.

The transport packet according to an embodiment of the present invention includes a network protocol 3010, an error indicator 3020, a stuffing indicator 3030, a pointer field 3040, stuffing bytes 3050, and/or a payload 3060.

The network protocol 3010 may indicate a network protocol type of the payload 3060 of the transport packet.

The error indicator 3020 may indicate whether an error is detected from the corresponding transport packet. The error indicator 3020 may have a field value of "0" to indicate that an error is not detected, and have a field value of "1" to indicate that an error is detected.

The stuffing indicator 3030 may indicate whether the corresponding transport packet includes the stuffing bytes 3050. The stuffing indicator 3030 may have a field value of "0" to indicate that the stuffing bytes 3050 are not included, and have a field value of "1" to indicate that a length field and the stuffing bytes 3050 are included in front of the payload 3060.

The pointer field 3040 may indicate a starting point of a new network protocol packet located in the payload 3060 of the corresponding transport packet. The field value of the pointer field 3040 may have the maximum value thereof (e.g., 0x7FF) to indicate that a starting point of a new network protocol packet is not present, and have any other value to indicate an offset value from the end of a header to a starting point of a new network protocol packet.

The stuffing bytes 3050 may indicate a value filled between the header and the payload 3060 when the value of the stuffing indicator 3030 is "1".

In the transport packet according to an embodiment of the present invention, the payload 3060 may include an IP datagram. This IP datagram may be encapsulated and transmitted using Generic Stream Encapsulation (GSE). In addition, a specific transmitted IP datagram may include signaling information for allowing a receiver to scan and acquire services or content.

FIG. 4 is a view showing a network protocol field of a transport packet received by a reception apparatus of a hybrid broadcast system, according to an embodiment of the present invention.

The network protocol field according to an embodiment of the present invention may have a field value of "000" to indicate that a payload of the corresponding transport packet has a network protocol type of IPv4 (conforming to RFC STD05 [5]), have a field value of "001-110" to indicate a reserved value for ATSC, and have a field value of "111" to indicate that the payload of the corresponding transport packet has a framed packet type.

FIG. 5 is a view showing a service map table according to an embodiment of the present invention.

The service map table according to an embodiment of the present invention may include a table_id field, a section_syntax_indicator field, a private_indicator field, a section_length field, a table_id_extension field, an SMT_protocol_version field, a version_number field, a current_next_indicator field, a section_number field, a last_section_number field, a num_services field, a service_id field, a service_status field, an SP_indicator field, a short_service_name_length field, a short_service_name field, a service_category field, a num_components field, an essential_component_indicator field, a num_component_level_descriptors field, a component_level_descriptor( ) field, a num_service_level_descriptors field, and/or a service_level_descriptor( ) field.

The table_id field indicates that the corresponding table is a table including related information, e.g., detailed information, of services or content.

The section_syntax_indicator field is a field indicating the format of a corresponding section, and has a field value of "1" to indicate a general table syntax format, or has a field value of "0" to indicate a "short form" format.

The private_indicator field has a field value of "1" to indicate that the corresponding section ends with CRC_32 of 4 bytes.

The section_length field indicates the length of the corresponding section.

The table_id_extension field is a field capable of including additional information for identifying the corresponding table.

The SMT_protocol_version field indicates a protocol version of the corresponding table.

The version_number field indicates the version of the corresponding section.

The current_next_indicator field is a 1-bit field, and has a field value of "1" to indicate that the current table is valid, or has a field value of "0" to indicate that the table is not currently valid but will be valid next time.

The section_number field indicates a section number of a current section in the corresponding table.

The last_section_number field indicates a section number of the last section of the corresponding table.

The num_services field indicates the number of services transmitted using the corresponding table.

The service_id field indicates the identifier of each service, which may be unique in one broadcast range.

The service_status field indicates whether a corresponding service is active or inactive, and hidden or not.

The SP_indicator field indicates whether service protection is applied to the corresponding service.

The short_service_name_length field indicates the length of the name of the service.

The short_service_name field indicates the name of the service.

The service_category field indicates the category of the service, and field values thereof will be described below.

The num_components field indicates the number of components associated with each service.

The essential_component_indicator field indicates whether a corresponding component is essential within the service.

The num_component_level_descriptors field indicates the number of associated component_level_descriptors.

The component_level_descriptor( ) field indicates a descriptor capable of providing an individual description corresponding to each component when a plurality of components are included in one service. A stream_identifier_descriptor for signaling information for identifying each of a plurality of components of one broadcast service, a data_path_descriptor for signaling information about a transmission path of the broadcast service, and/or a component_descriptor for signaling information about an encoding type of the components of the broadcast service, according to an embodiment of the present invention, may correspond to the component_level_descriptors.

The num_service_level_descriptors field indicates the number of associated service_level_descriptors.

The service_level_descriptor( ) field indicates a descriptor capable of providing a description applicable to all of a plurality of components of one service. A stream_identifier_descriptor, a data_path_descriptor, and/or a component_descriptor according to an embodiment of the present invention may correspond to the service_level_descriptors.

The service map table according to an embodiment of the present invention may be called a service information table. In addition, information for supporting acquisition of services or content included in the service map table according to an embodiment of the present invention may be transmitted in the form of an eXtensible Markup Language (XML) or a bitstream as well as in the form of a table. Furthermore, the service map table according to an embodiment of the present invention may be transmitted on a section basis, or on a message or fragment basis.

FIG. 6 is a view showing descriptions indicated by field values of the service_category field of the service map table, according to an embodiment of the present invention.

The service_category field has a field value of "0x00" to indicate that the category of a corresponding service is not specified, has a field value of "0x01" to indicate that the corresponding service is a basic TV service, has a field value of "0x02" to indicate that the corresponding service is a basic radio service, has a field value of "0x03" to indicate that the corresponding service is a Rights Issuer (RI) service, has a field value of "0x08" to indicate that the corresponding service is a service guide, has a field value of "0x09" to indicate that the corresponding service is an emergency alert service, has a field value of "0x04~0x07, or 0x0A" to indicate a service category not currently specified, or has a field value of "0x0B~0xFF" to indicate a reserved field for further use.

FIG. 7 is a view showing a service map table further including ensemble-related fields, according to an embodiment of the present invention.

An ensemble may refer to a set of one or more services to which the same-type Forward Error Correction (FEC) is applied.

The service map table of this figure includes the fields included in the service map table according to the previous embodiment, an ensemble_id field, a multi_ensemble_service field, a num_ensemble_level_descriptors field, and/or an ensemble_level_descriptor( ) field.

Descriptions of the fields included in the service map table according to the previous embodiment have been given above and thus are not provided herein.

The ensemble_id field may indicate an ID of an ensemble associated with the corresponding table.

The multi_ensemble_service field may indicate whether a corresponding service is usable in a current ensemble.

The num_ensemble_level_descriptors field may indicate the number of ensemble_level_descriptors.

The ensemble_level_descriptor( ) field may indicate a descriptor for providing a description commonly applied to one ensemble.

FIG. 8 is a view showing a stream_identifier_descriptor according to an embodiment of the present invention.

The stream_identifier_descriptor according to an embodiment of the present invention may identify a service or content component within a service map table. In addition, the stream_identifier_descriptor may correspond to a service_level_descriptor or a component_level_descriptor within the service map table.

The stream_identifier_descriptor according to an embodiment of the present invention may include a descriptor_tag field, a descriptor_length field, and/or a component_tag field.

The descriptor_tag field indicates the corresponding descriptor is a descriptor including stream identification information.

The descriptor_length field indicates a total length of the corresponding descriptor after the corresponding field.

The component_tag field is an 8-bit field and serves to identify a component stream related to a description provided by the component_level_descriptor. In addition, stream_identifier_descriptors of sections of the service map table may have different component_tag field values.

Since the field value of the corresponding component_tag field is unique within the service map table, a single stream among all transport streams may be found only using a combination of a transport stream identifier, a service ID, and a component_tag value.

The component_tag field according to an embodiment of the present invention may be called component identification information.

A plurality of components of a service or content may be identified using the component identification information according to an embodiment of the present invention, and a stream, a session, or the like for transmitting a corresponding component may be signaled using the component identification information.

The hybrid broadcast service reception apparatus according to an embodiment of the present invention may provide a specific service to a user by receiving components of the service if the service is selected by the user. In this process, the reception apparatus may identify the selected service with reference to a service ID included in a service map table. Then, the reception apparatus may identify components of the identified service with reference to component identification information. Additional information, e.g., transmission information, of the components identified using the component identification information is described in the service map table. The reception apparatus may acquire a corresponding component with reference to the additional information, and acquire a corresponding service including a plurality of components.

FIG. 9 is a view showing a data_path_descriptor according to an embodiment of the present invention.

The data_path_descriptor according to an embodiment of the present invention serves to allow a reception apparatus of a hybrid broadcast system to acquire and provide services and content over a broadcast network and an Internet protocol network. The data_path_descriptor may include service or content acquisition path information.

The data_path_descriptor according to an embodiment of the present invention may correspond to a service_level_descriptor or a component_level_descriptor of a service map table.

The data_path_descriptor according to an embodiment of the present invention may include a descriptor_tag field, a descriptor_length field, a delivery_network_type field, and/or a data_path(delivery_network_type) field.

The descriptor_tag field indicates that the corresponding descriptor is a descriptor including the service or content acquisition path information.

The descriptor_length field indicates a total length of the corresponding descriptor after the corresponding field.

The delivery_network_type field is a field indicating the type of a network capable of acquiring a service or content, and has field values to be described below with reference to FIG. 10. A detailed description thereof will be given below with reference to FIG. 10.

The data_path(delivery_network_type) field is a field including the service or content acquisition path information which varies depending on the value of the delivery_network_type field. Specific embodiments thereof will be described below with reference to FIGS. 11 to 18.

The delivery_network_type field according to an embodiment of the present invention may be called delivery network type information, and the data_path(delivery_network_type) field may be called data path information.

The reception apparatus according to an embodiment of the present invention may check a delivery network environment of each of a plurality of components of a service or content, using the delivery_network_type field, and preliminarily check a service or content transmission path in a specific delivery network environment, using the data_path (delivery_network_type) field. Accordingly, the reception apparatus may rapidly acquire the corresponding service or content using the delivery network type information and the data path information.

FIG. 10 is a view showing field values of the delivery_network_type field, according to an embodiment of the present invention.

The corresponding field has a field value of "0x00" to indicate that a service or content is transmitted using an IP stream of the same broadcaster or over a cellular network.

The corresponding field has a field value of "0x01" to indicate that the service or content is transmitted using IP streams of different broadcasters.

The corresponding field has a field value of "0x02" to indicate that the service or content is transmitted using a session based transport protocol, e.g., ACL/LCT or FLUTE, of the same broadcast stream.

The corresponding field has a field value of "0x03" to indicate that the service or content is transmitted using session based transport protocols, e.g., ACL/LCT or FLUTE, of different broadcast streams.

The corresponding field has a field value of "0x04" to indicate that the service or content is transmitted in the form of MPEG-2 TS streams of different broadcasters.

The corresponding field has a field value of "0x05" to indicate that the service or content is transmitted using packet based streams of different broadcasters.

The corresponding field has a field value of "0x06" to indicate that the service or content is transmitted using a packet based stream over an IP based broadcast network.

The corresponding field has a field value of "0x07" to indicate that the service or content is acquirable using a Uniform Resource Locator (URL).

The corresponding field has a field value of "0x08~0xFF" to indicate that the corresponding field is reserved.

The field value of the delivery_network_type field according to an embodiment of the present invention indicates whether the service or content is transmitted over a terrestrial broadcast network or an Internet protocol network.

The field values shown in FIG. 10 merely correspond to exemplary delivery network types according to an embodiment of the present invention, and various network types other than the types of FIG. 10 may be newly defined using the reserved field values.

FIG. 11 is a view showing syntax of a data_path( ) field when the delivery_network_type field has a field value of "0x00", according to an embodiment of the present invention.

When the field value of the delivery_network_type field according to an embodiment of the present invention is "0x00", a service or content may be acquired using an IP datagram within the same broadcast stream.

When the field value of the delivery_network_type field according to an embodiment of the present invention is "0x00", the data_path( ) field includes an IP_version_flag field, a source_IP_address_flag field, a destination_IP_address_flag field, a source_IP_address field, a destination_IP_address field, a port_num_count field, and/or a destination_UDP_port_num field.

The IP_version_flag field indicates an IP address format of an IP datagram including a service or content. The corresponding field has a field value of "0" to indicate that an IPv4 format is used, or has a field value of "1" to indicate that an IPv6 address format is used.

The source_IP_address_flag field indicates whether the IP datagram including the service or content includes a source IP address. The corresponding field has a field value of "1" to indicate that the IP datagram includes a source IP address.

The destination_IP_address_flag field indicates whether the IP datagram including the service or content includes a destination IP address. The corresponding field has a field value of "1" to indicate that the IP datagram includes a destination IP address.

The source_ IP_ address field indicates a source IP address of the IP datagram including the service or content, if the source_IP_address_flag value is "1".

The destination_ IP_ address field indicates a destination IP address of the IP datagram including the service or content, if the destination_IP_address_flag value is "1".

The port_num_count field indicates the number of ports of the flow of the IP datagram including the service or content.

The destination_port_number field indicates a UDP port number of the IP datagram including the service or content.

FIG. 12 is a view showing syntax of a data_path( ) field when the delivery_network_type field has a field value of "0x01", according to an embodiment of the present invention.

When the field value of the delivery_network_type field according to an embodiment of the present invention is "0x01", a service or content may be acquired using IP datagrams within different broadcast streams.

When the field value of the delivery_network_type field according to an embodiment of the present invention is "0x01", the data_path( ) field includes a transport_stream_id field, an IP_version_flag field, a source_IP_address_flag field, a destination_IP_address_flag field, a source_IP_address field, a destination_IP_address field, a port_num_count field, and/or a destination_UDP_port_num field.

The transport_stream_id field indicates an ID of a transport stream for transmitting an IP datagram including a service or content. Herein, the transport_stream_id field may have the same meaning as a broadcast_id field for identifying a broadcaster.

The IP_version_flag field indicates an IP address format of the IP datagram including the service or content. The corresponding field has a field value of "0" to indicate that an IPv4 format is used, or has a field value of "1" to indicate that an IPv6 address format is used.

The source_IP_address_flag field indicates whether the IP datagram including the service or content includes a source IP address. The corresponding field has a field value of "1" to indicate that the IP datagram includes a source IP address.

The destination_IP_address_flag field indicates whether the IP datagram including the service or content includes a destination IP address. The corresponding field has a field value of "1" to indicate that the IP datagram includes a destination IP address.

The source_IP_address field indicates a source IP address of the IP datagram including the service or content, if the source_IP_address_flag value is "1".

The destination_IP_address field indicates a destination IP address of the IP datagram including the service or content, if the destination_IP_address_flag value is "1".

The port_num_count field indicates the number of ports of the flow of the IP datagram including the service or content.

The destination_port_number field indicates a UDP port number of the IP datagram including the service or content.

FIG. 13 is a view showing syntax of a data_path( ) field when the delivery_network_type field has a field value of "0x02", according to an embodiment of the present invention.

When the field value of the delivery_network_type field according to an embodiment of the present invention is "0x02", a service or content may be acquired using a transport session according to a session based transport protocol, e.g., ACL/LCT or FLUTE, within the same broadcast stream.

When the field value of the delivery_network_type field according to an embodiment of the present invention is "0x02", the data_path( ) field includes an IP_version_flag field, a source_IP_address_flag field, a source_IP_address field, a destination_IP_address field, a destination_UDP_port_num field, and/or a tsi field.

The IP_version_flag field indicates an IP address format of an IP datagram for transmitting a transport packet including a service or content. The corresponding field has a field value of "0" to indicate that an IPv4 format is used, or has a field value of "1" to indicate that an IPv6 address format is used.

The source_IP_address_flag field indicates whether the IP datagram for transmitting the transport packet including the service or content includes a source IP address. The corresponding field has a field value of "1" to indicate that the IP datagram includes a source IP address.

The source_IP_address field indicates a source IP address of the IP datagram for transmitting the transport packet including the service or content, if the source_IP_address_flag value is "1".

The destination_IP_address field indicates a destination IP address of the IP datagram for transmitting the transport packet including the service or content.

The destination_port_number field indicates a UDP port number of the IP datagram for transmitting the transport packet including the service or content.

The tsi field indicates a Transport Session Identifier (TSI) of the transport session for transmitting the transport packet including the service or content.

FIG. 14 is a view showing syntax of a data_path( ) field when the delivery_network_type field has a field value of "0x03", according to an embodiment of the present invention.

When the field value of the delivery_network_type field according to an embodiment of the present invention is "0x03", a service or content may be acquired using transport sessions according to session based transport protocols, e.g., ACL/LCT or FLUTE, within different broadcast streams.

When the field value of the delivery_network_type field according to an embodiment of the present invention is "0x03", the data_path( ) field includes a transport_stream_id field, an IP_version_flag field, a source_IP_address_flag field, a source_IP_address field, a destination_IP_address field, a destination_UDP_port_num field, and/or a tsi field.

The transport_stream_id field indicates an ID of a transport stream for transmitting an IP datagram including a service or content. Herein, the transport_stream_id field may have the same meaning as a broadcast_id field for identifying a broadcaster.

The IP_version_flag field indicates an IP address format of the IP datagram for transmitting a transport packet including the service or content. The corresponding field has a field value of "0" to indicate that an IPv4 format is used, or has a field value of "1" to indicate that an IPv6 address format is used.

The source_IP_address_flag field indicates whether the IP datagram for transmitting the transport packet including the service or content includes a source IP address. The corresponding field has a field value of "1" to indicate that the IP datagram includes a source IP address.

The source_ IP_ address field indicates a source IP address of the IP datagram for transmitting the transport packet including the service or content, if the source_IP_address_flag value is "1".

The destination_ IP_ address field indicates a destination IP address of the IP datagram for transmitting the transport packet including the service or content.

The destination_port_number field indicates a UDP port number of the IP datagram for transmitting the transport packet including the service or content.

The tsi field indicates a Transport Session Identifier (TSI) of the transport session for transmitting the transport packet including the service or content.

FIG. 15 is a view showing syntax of a data_path( ) field when the delivery_network_type field has a field value of "0x04", according to an embodiment of the present invention.

When the field value of the delivery_network_type field according to an embodiment of the present invention is "0x04", a service or content may be acquired using MPEG-2 transport streams of different broadcasters.

When the field value of the delivery_network_type field according to an embodiment of the present invention is "0x04", the data_path( ) field includes a transport_stream_id field, and/or a pid field.

The transport_stream_id field indicates an ID of a transport stream for transmitting an MPEG-2 transport stream including a service or content. Herein, the transport_stream_id field may have the same meaning as a broadcast_id field for identifying a broadcaster.

The pid field indicates a Packet Identifier (PID) of an MPEG-2 transport stream packet including the service or content.

FIG. 16 is a view showing syntax of a data_path( ) field when the delivery_network_type field has a field value of "0x05", according to an embodiment of the present invention.

When the field value of the delivery_network_type field according to an embodiment of the present invention is "0x05", a service or content may be acquired using packet based streams of different broadcasters. The packet based stream may correspond to an MPEG-2 transport stream.

When the field value of the delivery_network_type field according to an embodiment of the present invention is "0x05", the data_path( ) field includes a transport_stream_id field, and/or a packet_id field.

The transport_stream_id field indicates an ID of a transport stream for transmitting an MPEG-2 transport stream including a service or content. Herein, the transport_stream_id field may have the same meaning as a broadcast_id field for identifying a broadcaster.

The packet_id field indicates an ID value of a packet including the service or content.

FIG. 17 is a view showing syntax of a data_path( ) field when the delivery_network_type field has a field value of "0x06", according to an embodiment of the present invention.

When the field value of the delivery_network_type field according to an embodiment of the present invention is "0x06", a service or content may be acquired using a packet based stream over an IP based broadcast network. Herein, the IP based broadcast network may refer to an Internet protocol network, and the packet based stream may correspond to an MPEG-2 transport stream.

When the field value of the delivery_network_type field according to an embodiment of the present invention is "0x06", the data_path( ) field includes an IP_version_flag field, a source_IP_address_flag field, a source_IP_address field, a destination_IP_address field, a destination_UDP_port_num field, and/or a packet_id field.

The IP_version_flag field indicates an IP address format of an IP datagram for transmitting a packet including a service or content. The corresponding field has a field value of "0" to indicate that an IPv4 format is used, or has a field value of "1" to indicate that an IPv6 address format is used.

The source_IP_address_flag field indicates whether the IP datagram for transmitting the packet including the service or content includes a source IP address. The corresponding field has a field value of "1" to indicate that the IP datagram includes a source IP address.

The source_IP_address field indicates a source IP address of the IP datagram for transmitting the packet including the service or content, if the source_IP_address_flag value is "1".

The destination_IP_address field indicates a destination IP address of the IP datagram for transmitting the packet including the service or content.

The destination_port_number field indicates a UDP port number of the IP datagram for transmitting the packet including the service or content.

The packet_id field indicates an ID value of the packet including the service or content.

FIG. 18 is a view showing syntax of a data_path( ) field when the delivery_network_type field has a field value of "0x07", according to an embodiment of the present invention.

When the field value of the delivery_network_type field according to an embodiment of the present invention is "0x07", a service or content may be acquired using a URL.

When the field value of the delivery_network_type field according to an embodiment of the present invention is "0x07", the data_path( ) field includes a URL_length field and/or a URL_char field.

The URL_length field indicates the length of a URL from which a service or content is downloadable.

The URL_char field indicates actual data of the URL from which a file of the service or content is downloadable.

FIG. 19 is a view showing a component_descriptor according to an embodiment of the present invention.

The component_descriptor according to an embodiment of the present invention serves to allow a reception apparatus of a hybrid broadcast system to acquire and provide services and content over a broadcast network and an Internet protocol network. The component_descriptor may signal service or content component type information and additional type information. In addition, the component_descriptor may correspond to a service_level_descriptor or a component_level_descriptor within a service map table. Furthermore, a description of the component_descriptor may be expressed in various forms, e.g., a bitstream and an XML.

The component_descriptor according to an embodiment of the present invention includes a descriptor_tag field, a descriptor_length field, a component_type field, a component_encryption_flag field, a num_STKM_streams field, an STKM_stream_id field, an STKM_stream_id field, a transport_parameters_text_length field, a transport_parameters_text( ) field, and/or a component_data(component_type) field.

The descriptor_tag field indicates that the corresponding descriptor is a descriptor including detailed information about a component.

The descriptor_length field indicates a total length of the corresponding descriptor after the corresponding field.

The component_type field indicates an encoding type of the corresponding component. The component_type field indicates the type of a payload of a transport packet or an RTP packet included in an IP datagram, and an embodiment thereof will be described below with reference to FIG. 20.

The component_encryption_flag field is a 1-bit field and has a field value of "1" to indicate that corresponding content is encrypted.

The num_STKM_streams field is an 8-bit field and indicates the number of Short-Term Key Message (STKM) streams related to the corresponding component.

The STKM_stream_id is a 16-bit field and indicates an ID of an STKM stream required to decrypt and acquire a protected component.

The transport_parameters_text_length field indicates the length of a transport_parameters_text( ) text string. An initial release of the corresponding field may have a value of "0".

The transport_parameters_text( ) field indicates a text string for identifying transport parameters of a component associated with a component_data( ) field to be described below. The corresponding field may include future transport constraints different from the initial release. For example, the future transport constraints may include a buffer model, the Maximum Transmission Unit (MTU) size, etc.

The component_data(component_type) field indicates encoding parameters and/or other parameters required to render the corresponding component. The structure of the corresponding field may be determined depending on the value of the component_type field. The corresponding field is applicable to the value of a currently defined component_type field.

FIG. 20 is a view showing a component_type list according to an embodiment of the present invention.

Component_type "35" indicates that a corresponding component is an H.264/Advanced Video Coding (AVC) video stream component or an H.264/Scalable Video Coding (SVC) base layer stream component.

Component_type "36" indicates that the corresponding component is an SVC enhancement layer stream.

Component_type "37" indicates that the corresponding component is a High efficiency Advanced Audio Coding (HE AAC) v2 audio stream component.

Component_type "38" indicates that the corresponding component is a FLUTE file delivery session.

Component_type "39" indicates that the corresponding component is an STKM stream component.

Component_type "40" indicates that the corresponding component is a Long-Term Key Message (LTKM) stream component.

Component_type "41" indicates that the corresponding component is an Open Mobile Alliance-Rich Media Environment (OMA-RME) Dynamic and Interactive Multimedia Scenes (DIMS) stream component.

Component_type "42" indicates that the corresponding component is a Network Time Protocol (NTP) timebase stream component.

Component_types "43 to 70" are unassigned by the Internet Assigned Numbers Authority (IANA) and are reserved by the Advanced Television Systems Committee (ATSC) for possible future use.

Component_types "71 to 76" are reserved by the IANA.

Component_types "77 to 95" are unassigned by the IANA.

Component_types "96 to 127" are designated by the IANA for dynamic use.

FIG. 21 is a view showing a component_type list including a component_type related to an ISO base media file format stream component, according to an embodiment of the present invention.

A hybrid broadcast service reception apparatus according to an embodiment of the present invention may decode and provide a service or content component to a user even when the service or content component is transmitted in an ISO base media file format using a broadcast stream.

As shown in FIG. 21, a value capable of indicating that a corresponding component is a stream encoded in an ISO base media file format may be assigned to a component_type of a component_descriptor.

In this case, unlike the component_type list of FIG. 20, component_type "71" indicates that a corresponding component is an ISO base media file format stream component, and component_types "72 to 76" are reserved by the IANA.

FIG. 22 is a view showing syntax of a component_data( ) field when a component_type indicates an ISO base media file format, according to an embodiment of the present invention.

The component_data( ) field according to an embodiment of the present invention may include a version field and/or a profile field.

The version field is an 8-bit field and indicates the version of an ISO base media file format.

The profile field indicates a specific profile of an ISO base media file format stream.

Figure 23:
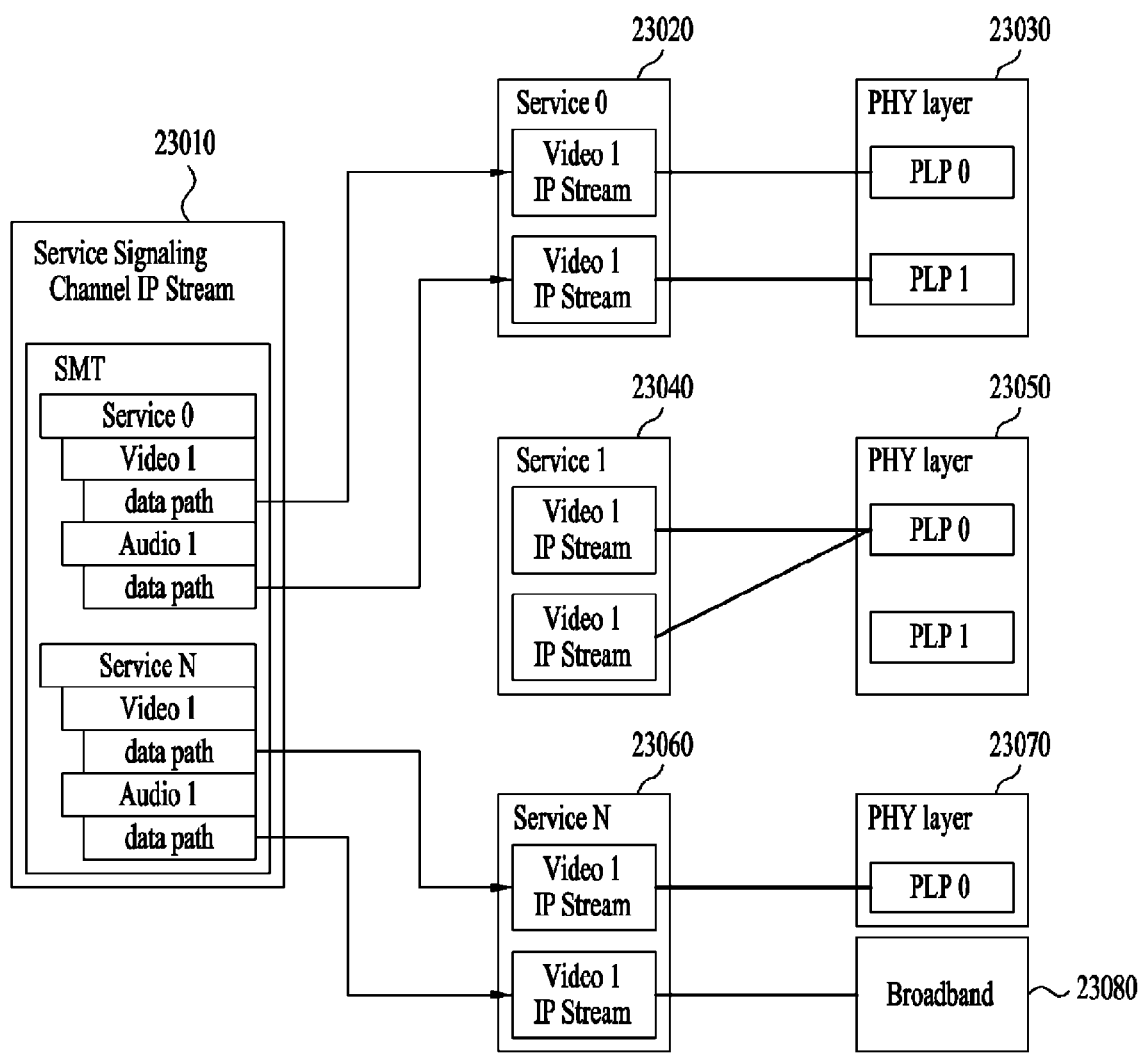
FIG. 23 is a view showing a service or content acquisition process based on cooperation of a terrestrial broadcast network and an Internet protocol network in a hybrid broadcast system, according to an embodiment of the present invention.

FIG. 23 is a view showing a service or content acquisition process based on cooperation of a terrestrial broadcast network and an Internet protocol network in a hybrid broadcast system, according to an embodiment of the present invention.

The service or content acquisition process in the hybrid broadcast system, according to an embodiment of the present invention, may be expressed as data flows among a service signaling channel IP stream 23010, an IP stream 23020 used to transmit service 0, a transport layer 23030 used to transmit service 0, an IP stream 23040 used to transmit service 1, a transport layer 23050 used to transmit service 1, an IP stream 23060 used to transmit service N, a transport layer 23070 for transmitting video 1 of service N, and/or an Internet protocol network 23080 for transmitting audio 1 of service N.

The service signaling channel IP stream 23010 may include a service map table SMT. The service map table SMT may include data path information of each of video 1 and audio 1 corresponding to components of service 0. In addition, the service map table SMT may include data path information of each of video 1 and audio 1 corresponding to components of service N. The data path information may be information about a transmission path of each component of a broadcast service.

The IP stream 23020 used to transmit service 0 may include one video component and one audio component. Herein, the video and audio components may be acquired using IP streams transmitted over a terrestrial broadcast network. That is, an IP stream for transmitting video 1 and an IP stream for transmitting audio 1 may be included in PLP 0 and PLP 1 of the transport layer 23030 used to transmit service 0, respectively, and transmitted over the terrestrial broadcast network.

The IP stream 23040 used to transmit service 1 may include one video component and one audio component. Herein, the video and audio components may be acquired using IP streams transmitted over a terrestrial broadcast network. In the case of service 1, both an IP stream for transmitting video 1 and an IP stream for transmitting audio 1 may be included in PLP 0 of the transport layer 23050 used to transmit service 1 and transmitted over the terrestrial broadcast network.

The IP stream 23060 used to transmit service N may include one video component and one audio component. In the case of service N, the video component may be transmitted over a terrestrial broadcast network but the audio component may be acquired over an Internet protocol network. That is, an IP stream for transmitting video 1 may be included in PLP 0 of the transport layer 23070 and transmitted over the terrestrial broadcast network, and an IP stream for transmitting audio 1 may be transmitted over the Internet protocol network 23080.

Figure 24:
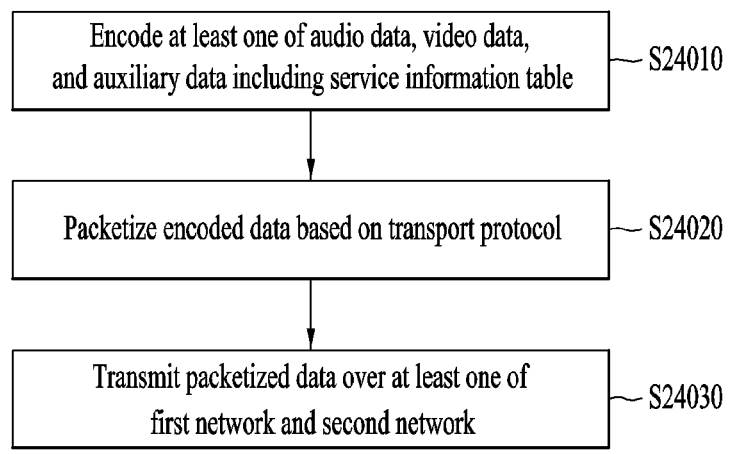
FIG. 24 is a flowchart of a hybrid broadcast service transmission method, according to an embodiment of the present invention.

FIG. 24 is a flowchart of a hybrid broadcast service transmission method, according to an embodiment of the present invention.

The hybrid broadcast service transmission method according to an embodiment of the present invention may include encoding at least one of audio data, video data, and auxiliary data including a service information table (S24010), packetizing the encoded data based on a transport protocol (S24020), and/or transmitting the packetized data over at least one of a first network and a second network (S24030).

In the step for encoding at least one of the audio data, the video data, and the auxiliary data including the service information table (S24010), the service information table may be called a service map table, the service information table may include a stream identifier descriptor for signaling information for identifying each of a plurality of components of one broadcast service, and the stream identifier descriptor may include component identification information. In addition, the service information table may include a data path descriptor for signaling information about a transmission path of the broadcast service, and the data path descriptor may include delivery network type information indicating a network type for transmitting the broadcast service, and data path information indicating a specific transmission path of the broadcast service in a network environment based on the network type. The service information table may include a component descriptor for signaling information about an encoding type of the components of the broadcast service, and the component descriptor may include ISO base media file format information. The ISO base media file format information may include at least one of version information of an ISO base media file format and profile information of an ISO base media file format stream.

In the step for packetizing the encoded data based on the transport protocol (S24020), the transport protocol may correspond to a Real time Transport Protocol (RTP), a Real time Transport Control Protocol (RTCP), an Asynchronous Layered Coding (ALC)/Layered Coding Transport (LCT) protocol, a File Delivery over Unidirectional Transport (FLUTE) protocol, a Transmission Control Protocol (TCP), a User Datagram Protocol (UDP), or an Internet Protocol (IP). For example, data may be packetized based on the UDP if the data is transmitted over a terrestrial broadcast network, or packetized based on the PCT if the data is transmitted over an Internet protocol network.

In the step for transmitting the packetized data over at least one of the first network and the second network (S24030), the first network may correspond to a terrestrial broadcast network, and the second network may correspond to an Internet protocol network. The packetized data may be transmitted over at least one of the terrestrial broadcast network and the Internet protocol network based on the data path information included in the service information table.

While the present invention has been described with reference to separate drawings for convenience, a new embodiment may be implemented by combining the embodiments described in relation to the drawings. When needed, designing a computer-readable recording medium having recorded thereon a program for executing the aforedescribed embodiments of the present invention may fall within the scope of the present invention.

The apparatus and method according to the present invention are not limited to the above-described embodiments. The whole or part of each embodiment may be selectively combined with that of another embodiment so as to make various modifications to the embodiments.

The hybrid broadcast service transmission method according to the present invention can also be embodied as processor-readable code on a processor-readable recording medium. The processor-readable recording medium is any data storage device that can store data which can be thereafter read by a processor. Examples of the processor-readable recording medium include read-only memory (ROM), random-access memory (RAM), CD-ROMs, magnetic tapes, floppy disks, optical data storage devices and carrier waves (e.g., transmission through the Internet). The processor-readable recording medium can also be distributed over network coupled computer systems so that the processor-readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

In addition, the disclosure describes both a product invention as well as a method invention, and descriptions of both inventions may be complementarily applied as needed.

MODE FOR INVENTION

Various embodiments have been described in the best mode for carrying out the invention.

INDUSTRIAL APPLICABILITY

The present invention is applicable to the whole broadcasting industry.

The invention claimed is:
1. A broadcast signal reception apparatus comprising:
a receiving processor that receives the broadcast signal including transport packets, wherein one of transport packets include a header and a payload including input packets,
wherein the header includes information indicating a type of the input packets included in the payload;
a parser that parses the transport packets from the broadcast signal, and parses input packets from the transport packets based on the information, and parses signaling data from the input packets,
wherein the signaling data describes information for a service wherein the signaling data includes information identifying the service, status information specifying whether status of the service is active or inactive, name information indicating a name of the service and delivery method type information indicating whether a component of the service is delivered through a broadcast network or a broadband network,
wherein the signaling data further includes location information, the location information is used for requesting the component,
wherein the signaling data includes IP address information indicating an IP address of an internet protocol (IP) packet carrying at least one transport session which carries the service, port number information indicating a destination port number of the the IP packet carrying the at least one transport session and a transport session identifier value identifying a transport session of the at least one transport session, wherein the transport session carries the component;

a decoder that decodes the signaling data, wherein the parser further parses a transport packet from the broadcast signal when the delivery method type information indicates that the component is delivered through the broadcast network, and parses the IP packet from the transport packet based on the IP address information and the port number information, and parses the transport session from the IP packet based on the transport session identifier value, and parses the component, wherein the decoder further decodes the component data based on the signaling data.

2. The apparatus of claim 1, wherein the broadcast signal includes information for rapid channel scans and service acquisition.

3. The apparatus of claim 1, wherein the signaling data includes a component descriptor for signaling information about an encoding type of the component of the service.

4. The apparatus of claim 3, wherein the component descriptor comprises ISO base media file format information.

5. The apparatus of claim 4, wherein the ISO base media file format information comprises at least one of version information of an ISO base media file format and profile information of an ISO base media file format stream.

6. A broadcast signal transmission method in a broadcast system, comprising:

generating a component of a service and signaling data, wherein the signaling data describes information for the service, wherein the signaling data includes information identifying the service, status information specifying whether status of the service is active or inactive, name information indicating a name of the service and delivery method type information indicating whether the component is delivered through a broadcast network or a broadband network, wherein the signaling data further includes location information, the location information is used for requesting the component, wherein the signaling data includes IP address information indicating an IP address of an internet protocol (IP) packet carrying at least one transport session which carries the service, port number information indicating a destination port number of the IP packet carrying the at least one transport session and a transport session identifier value identifying a transport session of the at least one transport session, wherein the transport session carries the component;

generating transport session packets to be carried in the transport session, wherein the transport session packets include the component;

generating input packets including the signaling data and the transport session packets;

generating a transport packet, wherein the transport packet includes a header and a payload including the input packets, wherein the header includes information indicating a type of the input packets in the payload;

generating a broadcast signal including the transport packet; and transmitting the generated broadcast signal.

7. The method of claim 6, wherein the broadcast signal includes information for rapid channel scans and service acquisition.

8. The method of claim 6, wherein the signaling data includes a component descriptor for signaling information about an encoding type of the component of the service.

9. The method of claim 8, wherein the component descriptor comprises ISO base media file format information.

10. The method of claim 9, wherein the ISO base media file format information comprises at least one of version information of an ISO base media file format and profile information of an ISO base media file format stream.

* * * * *